(12) United States Patent
Abe

(10) Patent No.: US 7,536,416 B2
(45) Date of Patent: May 19, 2009

(54) FACILITY SEARCH APPARATUS AND METHOD

(75) Inventor: Koichi Abe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 385 days.

(21) Appl. No.: 11/172,430

(22) Filed: Jun. 29, 2005

(65) Prior Publication Data
US 2006/0020373 A1     Jan. 26, 2006

(30) Foreign Application Priority Data
Jul. 14, 2004   (JP) ............................. 2004-206713

(51) Int. Cl.
*G06F 17/30* (2006.01)
*G06F 17/10* (2006.01)
(52) U.S. Cl. .................... 707/104.1; 707/3; 701/207; 701/208
(58) Field of Classification Search ............. 707/104.1; 701/207, 208
See application file for complete search history.

(56) References Cited

U.S. PATENT DOCUMENTS

| | | | | |
|---|---|---|---|---|
| 5,951,621 A * | 9/1999 | Palalau et al. | ............ | 340/995.2 |
| 6,144,920 A * | 11/2000 | Mikame | ............ | 701/212 |
| 6,374,180 B1 * | 4/2002 | Slominski et al. | ........... | 701/208 |
| 6,434,482 B1 | 8/2002 | Oshida et al. | | |
| 6,807,480 B1 * | 10/2004 | Iwasaki et al. | ............ | 701/209 |
| 6,839,628 B1 * | 1/2005 | Tu | ............... | 701/209 |
| 6,934,911 B2 * | 8/2005 | Salmimaa et al. | ........... | 715/744 |
| 6,970,786 B2 * | 11/2005 | Hayama et al. | ............. | 701/209 |
| 7,085,648 B2 * | 8/2006 | Ishiguro | ..................... | 701/208 |
| 7,225,077 B2 * | 5/2007 | Kouchiyama | ............... | 701/209 |
| 7,310,534 B2 * | 12/2007 | Northcutt | ................. | 455/456.6 |
| 2002/0130906 A1 * | 9/2002 | Miyaki | ........................ | 345/837 |
| 2003/0182056 A1 * | 9/2003 | Nozaki et al. | ............... | 701/209 |
| 2004/0039523 A1 * | 2/2004 | Kainuma et al. | ............ | 701/208 |
| 2004/0162669 A1 * | 8/2004 | Nagamasa | ................... | 701/208 |
| 2004/0243306 A1 * | 12/2004 | Han | ........................... | 701/211 |
| 2005/0251334 A1 * | 11/2005 | Mizuno | ..................... | 701/209 |
| 2007/0179711 A1 * | 8/2007 | Tobiyama et al. | ........... | 701/211 |

* cited by examiner

*Primary Examiner*—John E Breene
*Assistant Examiner*—Patrick E Sweeney
(74) *Attorney, Agent, or Firm*—Brinks Hofer Gilson & Lione

(57) ABSTRACT

A server stores facility information about a plurality of facilities to be searched for, in association with categories representing the facilities, and performs a search to determine whether or not each category contains any facility located within a predetermined area including the search point. A navigation system displays, based on search results from the server, the categories serving as search conditions in a manner such that whether or not there is any facility within each category is identifiable. For example, an image representing a category may be set not to be displayed when there is no facility within the category. Thus, based on the display status of each category, the user can identify whether or not there is any facility within each category at the time when categories to be searched are displayed.

20 Claims, 10 Drawing Sheets

FACILITY SEARCH APPARATUS AND METHOD

BACKGROUND OF THE INVENTION

1. Field of the Invention

The present invention relates to a facility search apparatus and method for searching for nearby facilities.

2. Description of the Related Art

There is a conventionally known navigation system with a function to search for facilities that are within a desired category and are located around, for example, the vehicle's location specified as a search point (see, for example, Japanese Unexamined Patent Application Publication No. 2003-101462, in particular, pages 3 to 5 and FIGS. 1 to 9). In this navigation system, the selection of a desired category by the user allows searching for facilities within the category.

In the navigation system disclosed in the above-described document, if, as a result of a search by category, no facility is found nearby, the user expands the search area to perform further searching until a certain number of facilities are retrieved. The user may travel to a retrieved facility if it is located, for example, within about 10 km from the search point. However, the user may not travel to the facility if it is located farther than that. In this case, for example, the user changes the category to search for other facilities. In the known navigation system, as described above, it cannot be determined, until a search is actually executed, whether or not there is any facility within a predetermined distance from the search point. If no facility is found within a predetermined distance, the user must return to a category selection screen to select a category again and wait every time until the search result is obtained. Such an operation is cumbersome and takes time until a desired facility is retrieved. In particular, in a communication navigation system sending a search request via a network connection to a map distribution server or the like, search data is sent and received at relatively low speed using a cellular phone. Since required data is sent and received every time a cumbersome operation as described above is performed, it takes considerable time until the final search result is obtained.

SUMMARY OF THE INVENTION

The present invention has been made in view of the problems described above. An object of the present invention is to provide a facility search apparatus and method that can not only reduce the search time but also improve the ease of operation.

To solve the problems described above, a facility search apparatus of the present invention includes facility-information storing means for storing facility information about a plurality of facilities to be searched for, in association with categories representing the facilities; search-point identification means for identifying the location of a search point; in-category-facility search means for performing a search to determine whether or not each category contains any facility located within a predetermined area including the search point; and category display means for displaying, based on search results from the in-category-facility search means, the categories serving as search conditions in a manner such that whether or not there is any facility within each category is identifiable.

Moreover, a facility search method includes a first step of identifying the location of a search point; a second step of performing a search to determine whether or not each category contains any facility located within a predetermined area including the search point; and a third step of displaying, based on search results in the second step, the categories serving as search conditions in a manner such that whether or not there is any facility within each category is identifiable.

Thus, the user can identify whether or not there is any facility within each category at the time when categories to be searched are displayed. Therefore, there is no need for the user to select a category and perform a facility search only to find that there is no facility within the category. This improves the ease of operation and reduces the search time, because the number of operations decreases.

It is desirable for the facility search apparatus to further include facility-list display means for displaying, when a category is selected from the categories displayed by the category display means, a list of the descriptions of facilities within the selected category; and facility-information display means for displaying, when a facility is selected from the list displayed by the facility-list display means, detailed information about the selected facility. Since the user can select a category to display a list of facilities after being informed that there are facilities within the category, the user selecting a category only to find that there is no facility to be displayed can be avoided. The avoidance of such needless steps simplifies the operation and reduces the time required to ultimately display facility details.

It is desirable that the facility-information display means display, as the detailed information, a map image of the area around the selected facility. This reduces the search time, as well as the number of operations, until a map image of the area around the facility is displayed as a search result.

It is desirable that the category display means display images representing the categories in different colors according to whether or not there is any facility within each category. This enables the user to reliably identify whether or not there is any facility within each category, just by looking at the color of an image representing each category.

It is desirable that the category display means display images representing the categories in different colors according to the number of facilities within each category. Alternatively, it is desirable that the category display means display the categories in such a manner that the number of facilities within each category is visually identifiable. This enables the user to easily identify the number of facilities within each category as well as whether or not there is any facility within each category, just by looking at the colors of images representing the categories or based on the differences in the display modes of such images.

It is desirable that the category display means set an image representing a category not to be displayed when there is no facility within the category. This enables the user to easily identify whether or not there is any facility within that category. Since a category with no corresponding facility is not displayed, an invalid operation, such as erroneously selecting such a category, can be reliably avoided.

It is desirable, when the expansion of a search area is requested after the categories are displayed by the category display means, that the in-category-facility search means expand the area of a search for determining whether or not there is any facility within each category and perform the search again. Thus, if no facility within the desired category is found within the current search area, the user can expand the search area to perform further searching until the desired category is displayed.

It is desirable that the category display means display images representing the categories in different colors according to the distance from the search point to a facility within each category. This enables the user to obtain the approximate distance from the search point to the nearest facility within each category, as well as whether or not there is any facility within each category.

It is desirable that an area to be searched by the in-category-facility search means be within a predetermined distance in a straight line from the search point. This enables the user to easily identify whether or not each category contains any facility located within a predetermined distance from the search point.

It is desirable that an area to be searched by the in-category-facility search means be within a predetermined longitudinal and latitudinal distance from the search point. This allows determination by a simple subtraction as to whether or not the location of each facility falls within the search area, and the simplification of the search process.

It is desirable that the search-point identification means and the category display means be included in a terminal device that the user can operate; and the facility-information storing means and the in-category-facility search means be included in a server connected via a communication line to the terminal device. This can reduce the number of communications, the communication time, and the volume of communications between the terminal device and the server.

It is desirable that the terminal device be installed in a vehicle, and the server be placed outside the vehicle. Since the number of communications and the communication time between the vehicle in motion and the server outside the vehicle can be reduced, the deterioration of communication conditions during driving and interruptions of communications can be avoided or reduced.

It is desirable that a line connecting the terminal device and the server be a switched line using a mobile phone. It is possible that the communication costs are extremely high, because the communication speed of a switched network for a mobile phone, such as a cellular phone, is generally low, and the rate per unit time is relatively high. However, since the number of communications and the communication time required to ultimately obtain facility details is reduced, the communication costs can be greatly reduced.

It is desirable that communication between the terminal device and the server via the above-described line be charged for in proportion to the line connection time. Using such a line can minimize costs proportional to the line connection time as the number of communications and the communication time decrease.

DESCRIPTION OF THE PREFERRED EMBODIMENTS

A facility search apparatus of an embodiment to which the present invention is applied will now be described with reference to the drawings.

Figure 1:
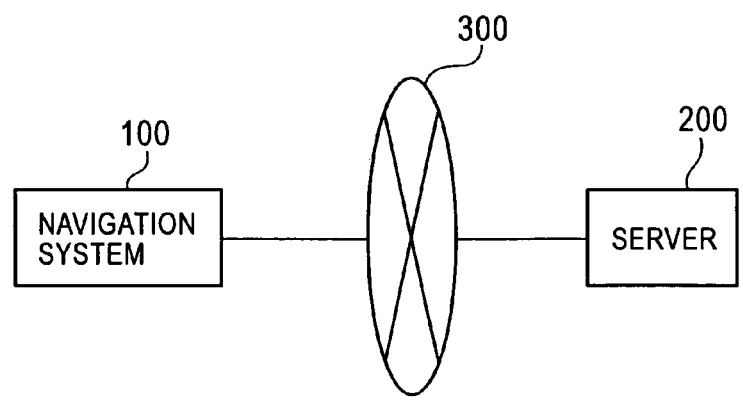
FIG. 1 shows the general structure of a facility search apparatus of an embodiment.

FIG. 1 shows the general structure of the facility search apparatus of the embodiment. As shown in FIG. 1, the facility search apparatus of the present embodiment includes a navigation system 100 and a server 200 connected to each other via a predetermined network 300. In the present embodiment, the network 300 can be one of a variety of communication networks, such as a public telephone network, a mobile telephone network, and the Internet.

Based on necessary data obtained from the server 200, the navigation system 100 shows a map of the area around the vehicle, provides traveling guidance along a guidance route to the destination, determines search criteria in searching for facilities, displays search results, and the like. The navigation system 100 is connected to the network 300 via, for example, a mobile phone (cellular phone). In response to various commands sent from the navigation system 100, the server 200, for example, distributes map data and searches for routes and facilities.

Figure 2:
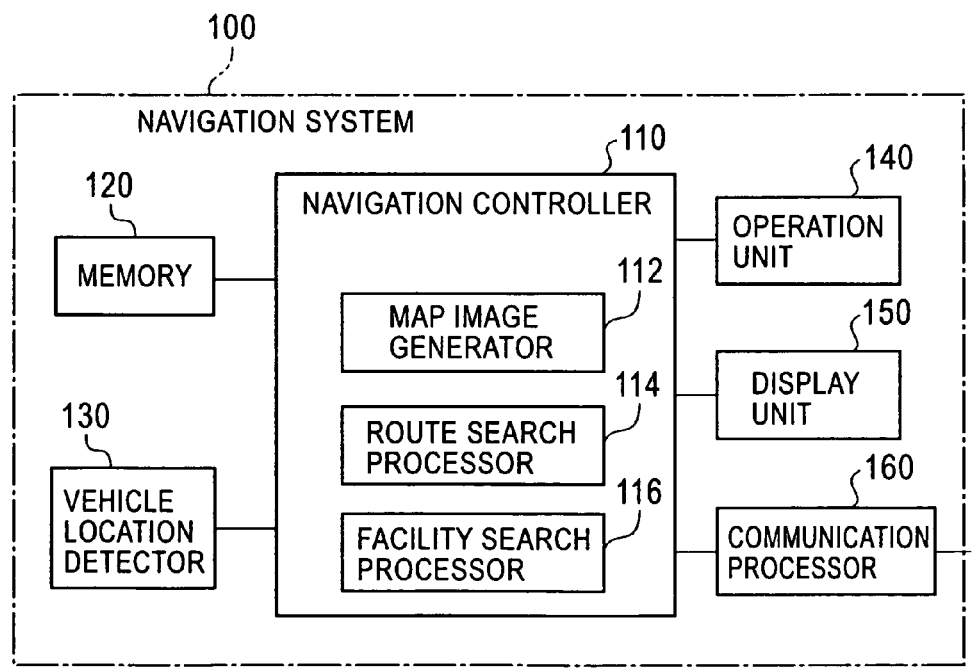
FIG. 2 shows the detailed structure of a navigation system.

The structure of the navigation system 100 will now be described in more detail. FIG. 2 shows the detailed structure of the navigation system 100. As shown in FIG. 2, the navigation system 100 includes a navigation controller 110, a memory 120, a vehicle location detector 130, an operation unit 140, a display unit 150, and a communication processor 160.

The navigation controller 110 controls the entire navigation system 100 and includes a map image generator 112, a route search processor 114, and a facility search processor 116. The navigation controller 110 is implemented by executing a predetermined operation program using a CPU, a ROM, a RAM, or the like.

The map image generator 112 sends the server 200 a request for the distribution of map data, along with the vehicle's location detected by the vehicle location detector 130. Based on map data sent from the server 200 in response to this request, the map image generator 112 causes the display unit 150 to display a map image of the area around the vehicle. The route search processor 114 sends the server 200 a route search request, along with a destination and the vehicle's location serving as a starting point. Then, the route search processor 114 guides the vehicle along a driving route (guidance route) returned, as a route search result, from the server 200. The facility search processor 116 sends the server 200 a search request specifying the location serving as a search point, and causes the display unit 150 to display the status of a search in progress and the search results including a variety of information.

The memory 120 stores, for example, map data, guidance route data, the status of a search in progress, and search results that are returned from the server 200. The vehicle location detector 130 includes a global positioning system (GPS) receiver, a direction sensor, and a distance sensor. The vehicle location detector 130 detects the vehicle's location (latitude and longitude) and provides the result of the detection to the navigation controller 110. The operation unit 140 includes various operation keys, such as cursor keys in four directions and a numeric keypad, and provides signals corresponding to the operation to the navigation controller 110. The display unit 150 displays, based on image data supplied from the navigation controller 110, a map image of the area around the vehicle, a guide map of an intersection along a guidance route, and an operation screen and result screen related to a facility search. The communication processor 160 performs processing necessary for data communication between the navigation controller 110 and the server 200 via the network 300.

Figure 3:
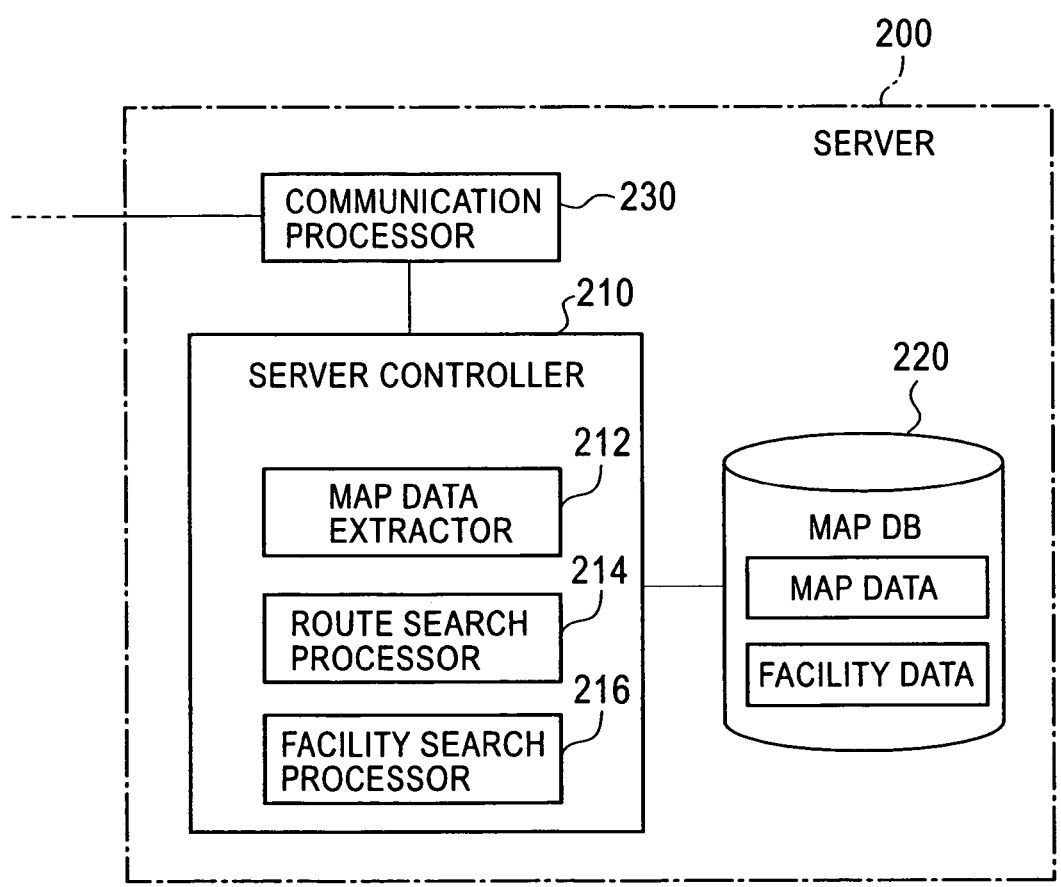
FIG. 3 shows the detailed structure of a server.

The structure of the server 200 will now be described in detail. FIG. 3 shows the detailed structure of the server 200. The server 200 shown in FIG. 3 includes a server controller 210, a map database (DB) 220, and a communication processor 230.

The server controller 210 controls the entire server 200 and includes a map data extractor 212, a route search processor 214, and a facility search processor 216. The server controller 210 is implemented by executing a predetermined operation program using a CPU, a ROM, a RAM, or the like.

When a request for the distribution of map data, along with the vehicle's location, is received from the navigation system 100 installed in the vehicle, the map data extractor 212 extracts, from the map database 220, map data necessary for displaying a map image of the area around the vehicle, and sends the map data back to the navigation system 100 from which the request for distribution is sent. Upon receipt of a route search request, along with a starting point and a destination, the route search processor 214 extracts the most appropriate driving route between the starting point and the destination, and sends the route back to the navigation system 100 from which the route search request is sent. Upon receipt of a facility search request, along with a search point, the facility search processor 216 searches facility data stored in the map database 220 to ultimately extract details of a facility. In this facility search process, information in the process of being searched is sent and received multiple times as necessary between the facility search processor 216 and the navigation system 100.

The map database 220 stores map data necessary for displaying maps and searching for routes, and facility data necessary in searching for facilities. In the map database 220, facility information about a plurality of facilities to be searched is associated with related categories and stored as facility data. The communication processor 230 performs processing necessary for data communication between the server controller 210 and the navigation system 100 via the network 300.

The map database 220 corresponds to the facility-information storing means; the facility search processor 116 corresponds to the search-point identification means, category display means, facility-list display means, and facility-information display means; and the facility search processor 216 corresponds to the in-category facility search means. The navigation system 100 corresponds to the terminal device.

The operation of the facility search apparatus of the present embodiment having the structure described above will now be described.

Figure 4:
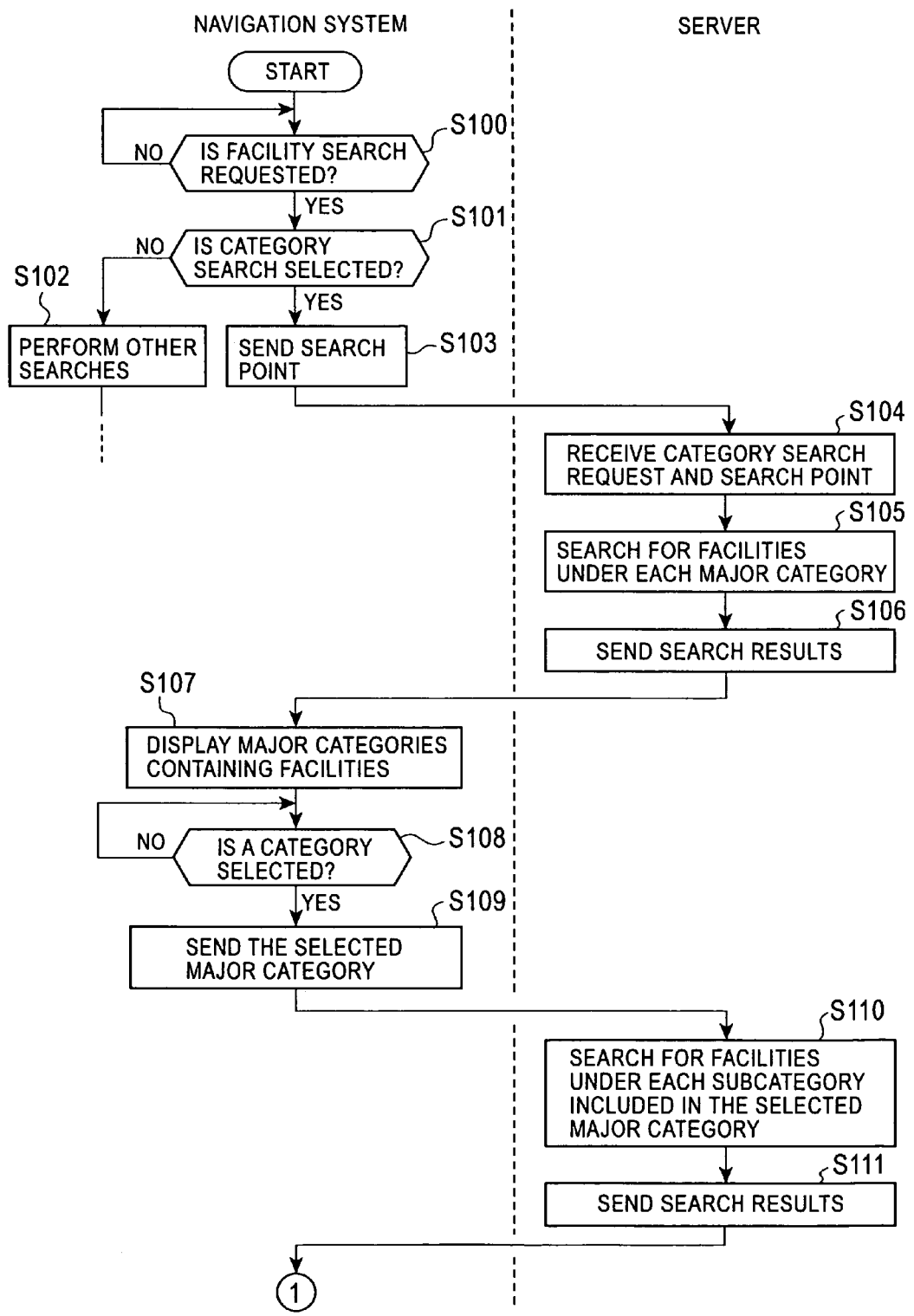
FIG. 4 is a flowchart showing the operation procedure of a facility search apparatus.
Figure 5:
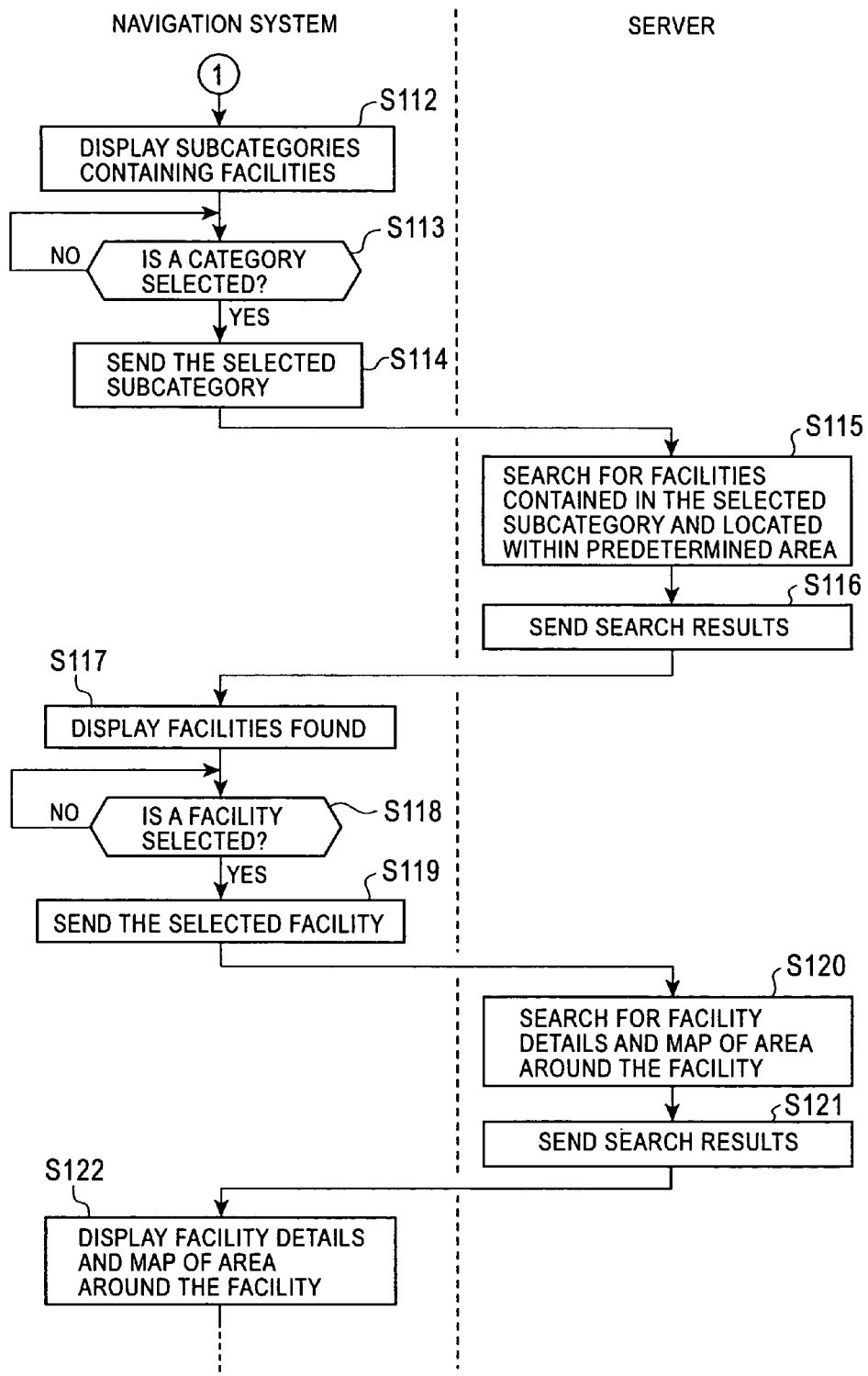
FIG. 5 is a flowchart showing the continued operation procedure of the facility search apparatus.

FIG. 4 and FIG. 5 are flowcharts, each showing an operation procedure of the facility search apparatus. In particular, the operation procedures of the navigation system 100 and the server 200 are shown. The facility search processor 116 of the navigation system 100 determines whether or not the user has requested a facility search (step S100). If it is not determined that the user has requested a facility search, the process in step S100 is repeated. If it is determined in step S100 that the user has requested a facility search using the operation unit 140, the facility search processor 116 determines whether or not a search by category has been selected (step S101).

Figure 6:
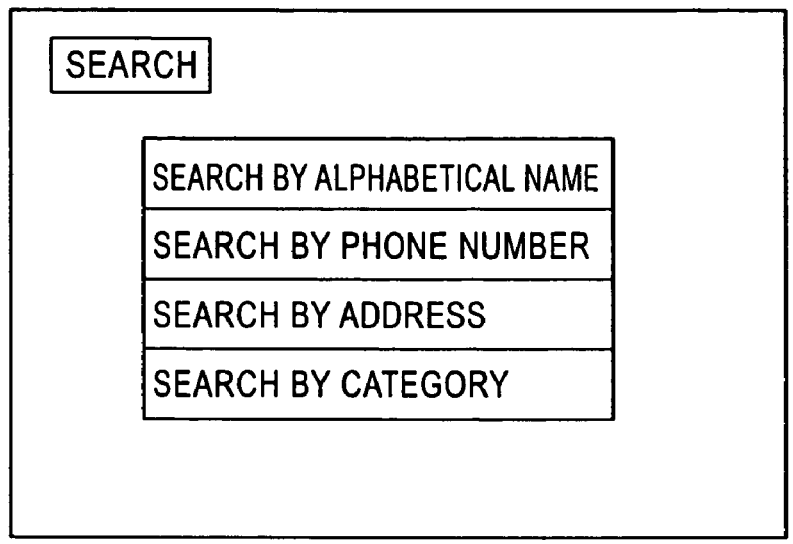
FIG. 6 shows an operation screen enabling the user to select a search method.

FIG. 6 shows an operation screen enabling the user to select a search method. For example, four search options, such as "Search by alphabetical name", "Search by phone number", "Search by address", and "Search by category" are available. If it is determined in step S101 that the user has selected, using the operation unit 140, any of the three options other than "Search by category", the facility search processor 116 sends and receives a variety of information to and from the facility search processor 216 in the server 200 to perform facility search processing (step S102). If it is determined in step S101 that the user has selected "Search by category" using the operation unit 140, the facility search processor 116 identifies and sends the current search point along with a category search request to the server 200 (step S103). For example, the vehicle's location detected by the vehicle location detector 130 may be set as the search point. The user also may scroll around a map image, using the operation unit 140, and choose any point as the search point.

Figure 7:
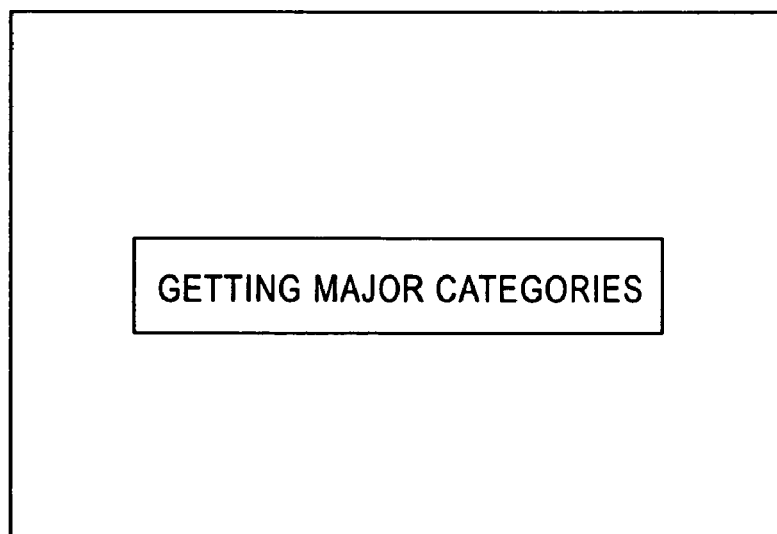
FIG. 7 shows a screen indicating that major categories are being searched.

When a category search request and the search point are received (step S104), the facility search processor 216 of the server 200 performs a search to determine whether or not there is any facility within each main category (step S105), and sends the search results to the navigation system 100 (step S106). During the period in which the operation in each of steps 104 to 106 is performed in the server 200, the facility search processor 116 of the navigation system 100 causes the display unit 150 to display a message indicating, as in FIG. 7, that major categories are being searched.

Figure 8:
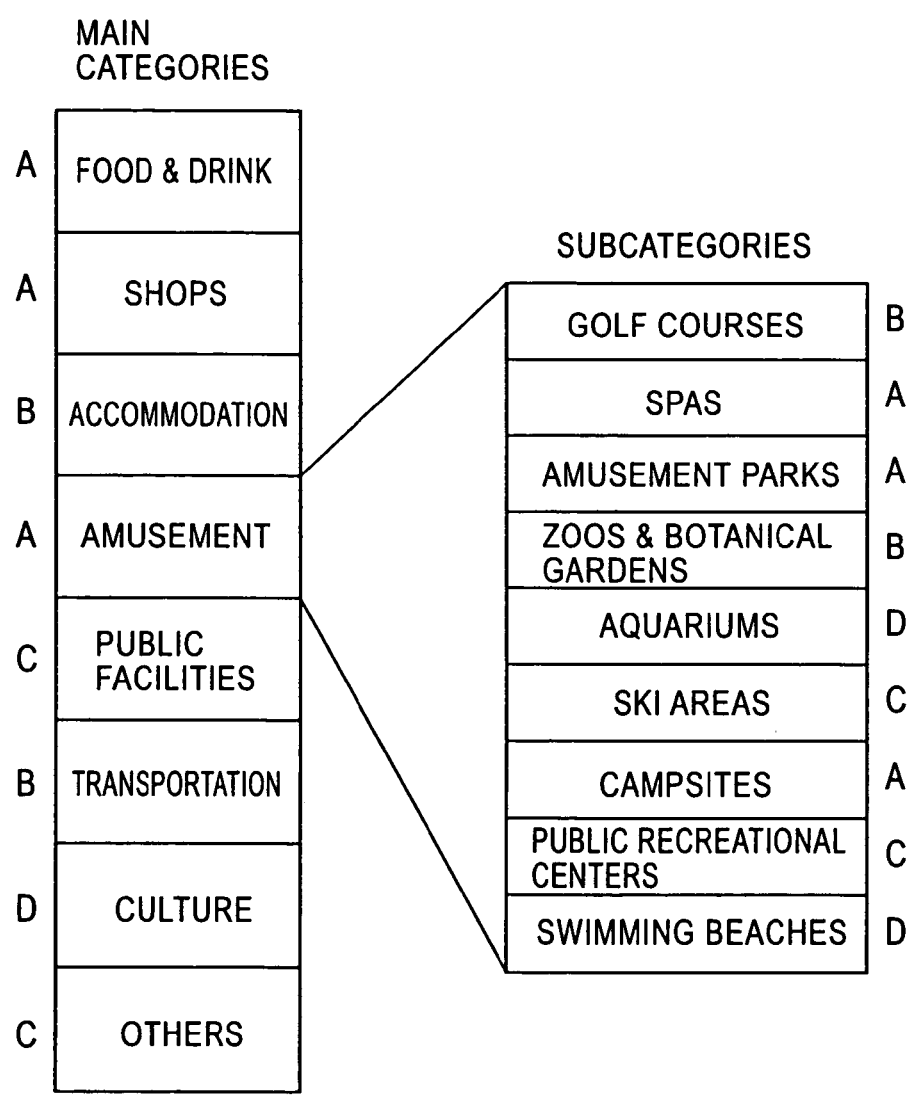
FIG. 8 shows the categories of facilities.

FIG. 8 shows the categories of the facilities. In the present embodiment, as shown in FIG. 8, facilities are classified into major categories and subcategories. The major categories are "Food & Drink", "Shops", "Accommodation", "Amusement", "Public Facilities", "Transportation", "Culture", and "Others". Each of the letters A to D appearing on the left of each major category indicates the level of distance in a straight line from the search point to the nearest facility among other facilities within the category. Letter A indicates that the distance is within 10 km, letter B indicates that the distance is larger than 10 km but within 20 km, letter C indicates that the distance is larger than 20 km but within 30 km, and letter D indicates that the distance is larger than 40 km or no facility is found within the category. Each major category contains a plurality of subcategories. For example, the major category "Amusement" contains subcategories such as "Golf Courses", "Spas", "Amusement Parks", "Zoos & Botanical Gardens", "Aquariums", "Ski Areas", "Campsites", "Public Recreational Centers", and "Swimming Beaches". Each of the letters A to D appearing on the right of each subcategory also indicates the level of distance in a straight line from the search point to the nearest facility among other facilities within the subcategory. The levels of distance indicated by the letters A to D are the same as those in the case of the major categories.

Figure 9:
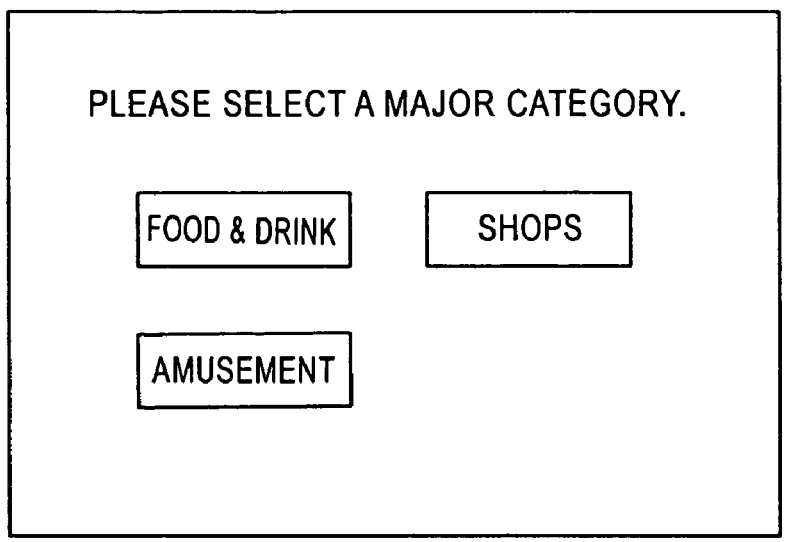
FIG. 9 shows a search screen displaying only major categories containing facilities located within 10 km.

The facility search processor 216 in the server 200 identifies major categories containing facilities located within 10 km and sends those major categories as the search results to the navigation system 100. The facility search processor 116 in the navigation system 100 receives and displays the search results (step S107). FIG. 9 shows a search screen displaying only the major categories containing facilities located within 10 km. In this example, three major categories, such as "Food & Drink", "Shops", and "Amusement," are provided as options.

Then, the facility search processor 116 determines whether or not one of the major categories on the search screen has been selected (step S108). The process in step S108 is repeated until a major category is selected. If the user selects a major category using the operation unit 140, it is determined in step S108 that a major category has been selected. The facility search processor 116 then identifies and sends the selected major category to the server 200 (step S109).

Figure 10:
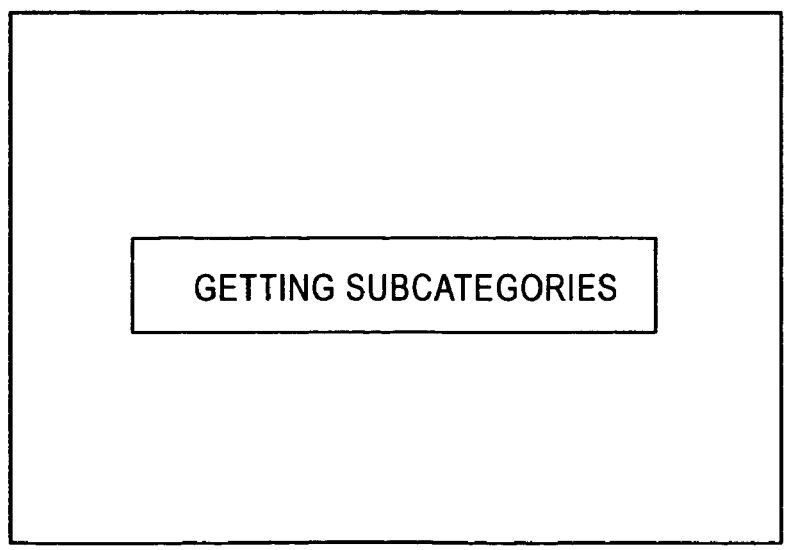
FIG. 10 shows a screen indicating that subcategories are being searched.

When the major category identified in the navigation system 100 is received, the facility search processor 216 of the server 200 performs a search to determine whether or not there is any facility within each of the subcategories under the major category (step S10), and sends the search results to the navigation system 100 (step S111). During the period in which the operation in each of steps 110 and 111 is performed in the server 200, the facility search processor 116 of the navigation system 100 causes the display unit 150 to display a message indicating, as in FIG. 10, that subcategories are being searched.

The facility search processor 216 in the server 200 identifies subcategories containing facilities located within 10 km and sends those subcategories as the search results to the navigation system 100. For example, in FIG. 8, when a major category "Amusement" is selected, "Spa", "Amusement Park", and "Campsite" are found to be subcategories containing facilities located within 10 km and are sent as the search results to the navigation system 100.

Figure 11:
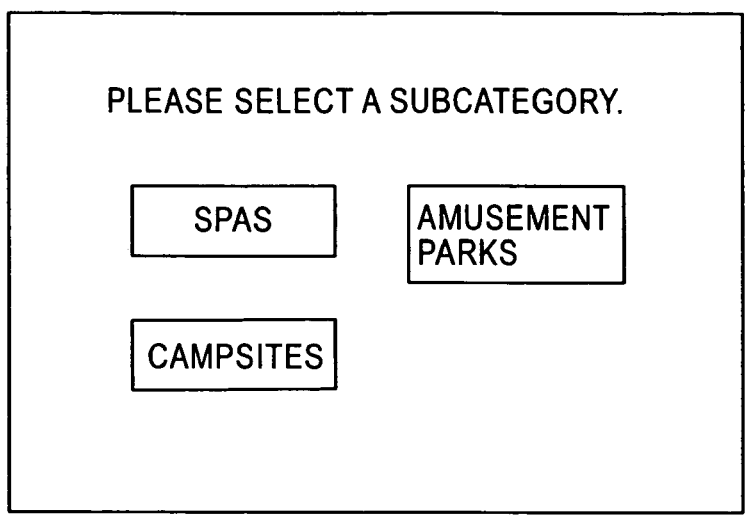
FIG. 11 shows a search screen displaying only subcategories containing facilities located within 10 km.

The facility search processor 116 in the navigation system 100 receives and displays the search results (step S112). FIG. 11 shows a search screen displaying only the subcategories containing facilities located within 10 km. In this example, three subcategories, such as "Spas", "Amusement Parks", and "Campsites" are provided as options.

Then, the facility search processor 116 determines whether or not one of the subcategories on the search screen has been selected (step S113). The process in step S113 is repeated until a subcategory is selected. If the user selects a subcategory using the operation unit 140, it is determined in step S113 that a subcategory has been selected. The facility search processor 116 then identifies and sends the selected subcategory to the server 200 (step S114).

Figure 12:
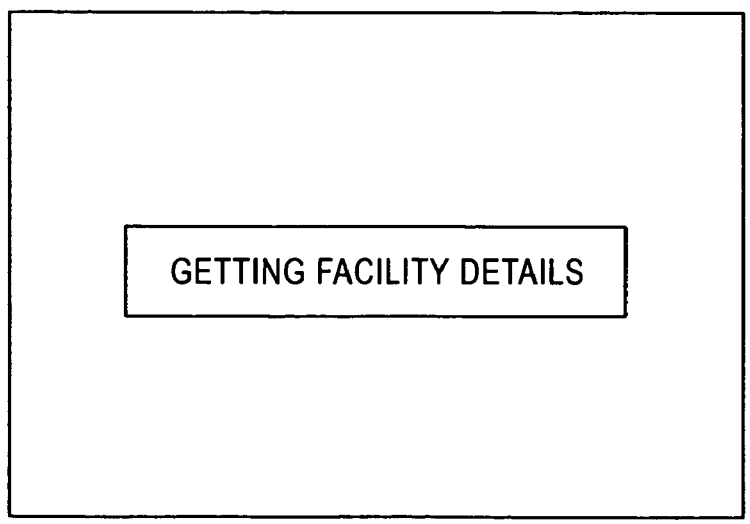
FIG. 12 shows a screen indicating that facility details are being searched.

When the subcategory identified in the navigation system 100 is received, the facility search processor 216 of the server 200 searches for facilities contained in the subcategory and located within a predetermined distance (within 10 km) (step S115), and sends the search results to the navigation system 100 (step S116). During the period in which the operation in each of steps 115 and 116 is performed in the server 200, the facility search processor 116 in the navigation system 100 causes the display unit 150 to display a message indicating, as in FIG. 12, that facility details are being searched.

Figure 13:
FIG. 13 shows a search result screen on which search results under a subcategory are listed.

The facility search processor 116 in the navigation system 100 receives and displays the search results (step S17). FIG. 13 shows a search result screen on which search results under a subcategory are listed. In FIG. 13, for example, facilities (campsites) contained in a selected subcategory "Campsites" and located within 10 km of the search point are retrieved and displayed. In this example, the names of the retrieved campsites, as well as the distances and rough directions to the sites, are listed in order of proximity to the sites from the search point.

Then, the facility search processor 116 determines whether or not one of the facilities on the search result screen has been selected (step S118). The process in step S118 is repeated until a facility is selected. If the user selects a facility using the operation unit 140, it is determined in step S118 that a facility has been selected. The facility search processor 116 then identifies and sends the selected facility to the server 200 (step S119).

Figure 14:
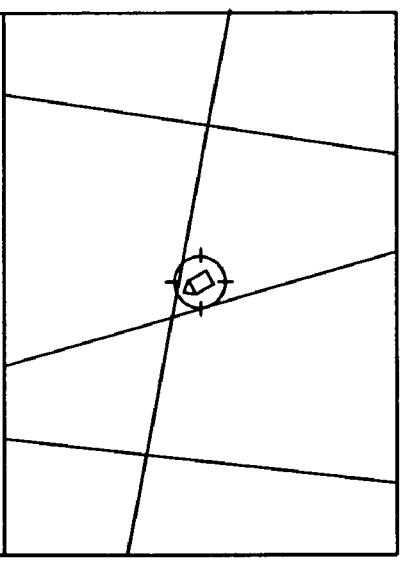
FIG. 14 shows a search result screen displaying a map of the area around a facility and detailed information about the facility.

When the facility identified in the navigation system 100 is received, the facility search processor 216 of the server 200 searches for a map of the area around the facility and detailed information about the facility (step S120) and sends the search results to the navigation system 100 (step S121). The facility search processor 116 in the navigation system 100 receives and displays the search results (step S122). FIG. 14 shows a search result screen displaying a map of the area around a facility and detailed information about the facility. For example, a map image of the facility is displayed on the right half of the screen, and detailed information about the facility is displayed on the left half of the screen.

In the facility search apparatus of the present embodiment, as described above, the user can identify whether or not there is any facility within each category at the time when main categories and subcategories to be searched are displayed. Therefore, there is no need for the user to select a category and perform a facility search only to find that there is no facility within the category. This improves the ease of operation and reduces the search time, because the number of operations decreases. Since the user can select a category to display a list of facilities after being informed that there are facilities within the category, the user selecting a category only to find that there is no facility to be displayed can be avoided. The avoidance of such needless steps simplifies the operation and reduces the time required to ultimately display facility details. At the same time, the search time, as well as the number of operations, until a map image of the area around a facility is displayed as a final search result can be reduced.

Since a category with no corresponding facility is not displayed, it is obvious to the user whether or not there is any facility within that category. Therefore, an invalid operation, such as erroneously selecting such a category, can be reliably avoided.

In the facility search apparatus of the present embodiment, where the navigation system 100 in the vehicle communicates with the server 200 outside the vehicle via a switched network of a cellular phone or the like to perform a facility search, the number of communications, the communication time, and the volume of communications between the navigation system 100 and the server 200 can be reduced. In particular, since the number of communications and the communication time between the vehicle in motion and the server 200 outside the vehicle can be reduced, the deterioration of communication conditions during driving and interruptions of communications can be avoided or reduced. It is possible that the communication costs are extremely high, because the communication speed of a switched network for a mobile phone, such as a cellular phone, is generally low, and the rate per unit time is relatively high. However, since the number of communications and the communication time required to ultimately obtain facility details are reduced, the communication costs can be greatly reduced. Moreover, although communication is charged for in proportion to the line connection time, costs proportional to the line connection time can be minimized by the reduction of the number of communications and the communication time.

The present invention is not limited to the embodiment described above, and various modifications can be made within the scope of the present invention. For example, although, in the embodiment described above, each of the major categories and subcategories is displayed or not displayed depending on whether or not there is any facility within the category, the categories may be displayed in different colors. For example, the categories may be displayed in blue or red, or may be highlighted or not highlighted (this is also a change of color in a broad sense), depending on whether or not there is any facility within the category. This enables the user to reliably identify whether or not there is any facility within each category, just by looking at the color of an image representing each category.

The color may be changed not only according to whether or not there is any facility within each category, but also according to the number of facilities within each category. In this case, a category with no corresponding facility may be either displayed or not displayed. Categories may be displayed, instead of varying their colors, in another visually identifiable manner, such as varying the shapes of images representing the categories according to the number of their corresponding facilities. This enables the user to easily identify the number of facilities within each category as well as whether or not there is any facility within each category, just by looking at the colors of images representing the categories or based on the differences in the display modes of such images.

Figure 15:
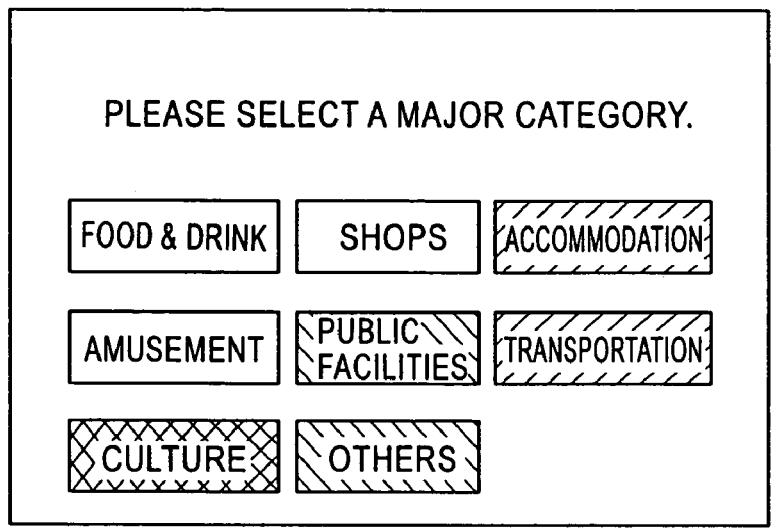
FIG. 15 shows a screen displaying major categories in different colors according to the distance between a facility within each category and the search point.

Images representing categories may be displayed in different colors according to the distance between a corresponding facility and the search point. FIG. 15 shows a screen providing major categories displayed in different colors according to the distance between the corresponding facility and the search point. Different hatching patterns are used in FIG. 15 to show differences in color. This enables the user to obtain the approximate distance from the search point to the nearest facility within each category, as well as whether or not there is any facility within each category.

Figure 16:
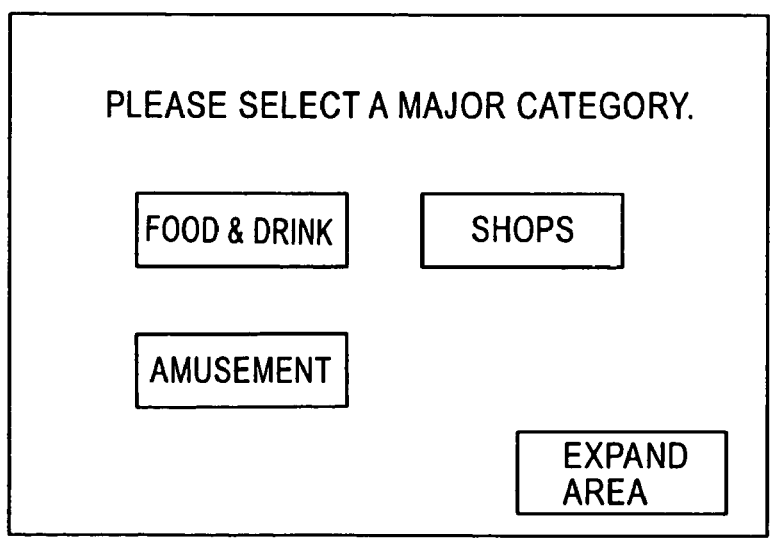
FIG. 16 shows a search screen enabling the user to request the expansion of the search area.

In the above-described embodiment where categories with no corresponding facility are not displayed, an option to enable the user to expand the scope of the search may be provided, as there will be cases where the user wishes to search for facilities within the categories that are not displayed. FIG. 16 shows a search screen enabling the user to request the expansion of the search area. If an "Expand Area" button is selected on the screen when only three major categories containing facilities within 10 km are displayed, the corresponding command is sent to the server 200, in which the facility search processor 216 expands the search area from within 10 km to within 20 km, thereby determining whether or not there is any facility within each major category. Thus, if no facility under the desired category is found within the current search area, the user can expand the search area to perform further searching until the desired category is displayed.

Although the above-described embodiments focus on the linear distance between the search point and each facility, the longitudinal and latitudinal distance from the search point to each facility may also be used. This allows determination by a simple subtraction as to whether or not the location of each facility falls within the search area, and the simplification of the search process.

Although, in the above-described embodiments, the navigation system 100 in the vehicle is connected via the network 300 to the server 200 to perform a facility search, the navigation system 100 may store facility data and the like to perform a facility search without communicating with the external server 200 and the like.

It is therefore intended that the foregoing detailed description be regarded as illustrative rather than limiting, and that it be understood that it is the following claims, including all equivalents, that are intended to define the spirit and scope of this invention.

What is claimed is:

1. A facility search apparatus comprising:
a facility-information storing unit for storing facility information about a plurality of facilities to be searched for, in association with categories representing the facilities;
a search-point identification unit identifying the location of a search point;
an in-category-facility search unit configured to perform a search to determine whether or not a category contains any facility located within a predetermined area including the search point when a request is received to display the plurality of search categories, wherein the first search is performed prior to any of the displayed categories being selected; and
a category display unit configured to display, based on search results from the in-category-facility search unit, images representing categories serving as search conditions, wherein the shape of the images representing the categories is changed according to whether or not a facility is found within the predetermined area for each category, and wherein the images are displayed in a list arrangement without displaying the search results on a map.

2. The facility search apparatus according to claim 1, further comprising:
a facility-list display unit displaying, when a category is selected from the categories displayed by the category display unit, a list of the descriptions of facilities under the selected category; and
a facility-information display unit displaying, when a facility is selected from the list displayed by the facility-list display unit, detailed information about the selected facility.

3. The facility search apparatus according to claim 2, wherein the facility-information display unit displays a map image of the area around the selected facility.

4. The facility search apparatus according to claim 1, wherein when the in-category facility search unit finds at least one facility located within the predetermined area including the search point, the category display unit displays images representing the categories in a plurality of colors corresponding to the non-zero number of facilities found within each category.

5. The facility search apparatus according to claim 1, wherein the category display unit displays the categories in such a manner that the number of facilities within each category is visually identifiable.

6. The facility search apparatus according to claim 1, wherein the category display unit sets an image representing a category not to be displayed when there is no facility under the category.

7. The facility search apparatus according to claim 1, wherein the category display unit displays images representing the categories in different colors according to the distance from the search point to a facility within each category.

8. The facility search apparatus according to claim 1, wherein an area to be searched by the in-category-facility search unit is within a predetermined distance in a straight line from the search point.

9. The facility search apparatus according to claim 1, wherein an area to be searched by the in-category-facility search unit is within a predetermined longitudinal and latitudinal distance from the search point.

10. The facility search apparatus according to claim 1, wherein the search-point identification unit and the category display unit are included in a terminal device that the user can operate; and the facility-information storing unit and the in-category-facility search unit are included in a server connected via a communication line to the terminal device.

11. The facility search apparatus according to claim 10, wherein the terminal device is installed in a vehicle and the server is placed outside the vehicle.

12. The facility search apparatus according to claim 11, wherein a communication line connecting the terminal device and the server is a switched line using a mobile phone.

13. The facility search apparatus according to claim 12, wherein communication between the terminal device and the server via the communication line is charged for in proportion to line connection time.

14. A facility search method comprising:
identifying the location of a search point;
performing a first search to determine whether or not a category contains any facility located within a predetermined area including the search point when a request is received to display a plurality of search categories, wherein the first search is performed prior to any of the displayed categories being selected;
displaying, on a display unit based on the first search results, images representing each of a plurality of displayed categories serving as search conditions in different colors according to the distance from the search point to a facility within each category at the time the search is performed;
displaying an expand category option after the plurality of categories are displayed by the category display unit;
automatically expanding the predetermined area for performing a search if the expand category option is selected;
performing a second search to determine whether or not a category contains any facility located within the automatically expanded predetermined area including the search point, if the expand category option is selected; and
displaying, based on the second search results, images representing each of a plurality of categories serving as search conditions in different colors according to the distance from the search point to a facility found within each category at the time the search is performed within the automatically expanded predetermined area, wherein the images representing each of the plurality of categories are displayed in different colors based on the second search results prior to any category being selected, and wherein the images are displayed in a list arrangement without displaying the first and second search results on a map.

15. The facility search method according to claim 14, wherein an image representing a category is set not to be displayed when there is no facility within the category.

16. A facility search apparatus comprising:
a facility-information storing unit configured to store facility information about a plurality of facilities to be searched for, in association with categories representing the facilities;
a search-point identification unit configured to identify the location of a search point;
an in-category-facility search unit configured to perform a first search to determine whether or not a category contains any facility located within a predetermined area including the search point when the in-category-facility search unit receives a request to display a plurality of categories, wherein the first search is performed prior to any of the displayed categories being selected; and
a category display unit configured to display an expand category option, and display images representing each of the plurality of categories in a plurality of colors corresponding to the non-zero number of facilities found within each category when the in-category facility search unit finds at least one facility located within the predetermined area including the search point,
wherein, when the expand category option is selected after the plurality of categories are displayed by the category display unit, the in-category-facility search unit automatically expands the predetermined area used to determine whether or not there is any facility within each category and performs a second search using the automatically expanded predetermined area to determine whether or not a category contains any facility located within the automatically expanded predetermined area including the search point, wherein prior to any category being selected each of the plurality of categories are displayed in a plurality of colors corresponding to the non-zero number of facilities found in the second search, and wherein the images are displayed in a list arrangement without displaying the search results on a map.

17. The facility search apparatus according to claim 1, wherein if more than one facility is located within the area searched by the in-category-facility search unit, the shape of the images representing the categories is changed according to the number of facilities found by the in-category-facility search unit.

18. The facility search apparatus according to claim 1, wherein the category display unit also displays an expand category option, and when the expand category option is selected after the categories are displayed by the category display unit, the in-category-facility search unit automatically expands the predetermined area used to determine whether or not there is any facility within each category and performs a second search using the automatically expanded predetermined area to determine whether or not a category contains any facility located within the automatically expanded predetermined area including the search point.

19. The facility search apparatus according to claim 16, further comprising:
a facility-list display unit displaying, when a category is selected from the categories displayed by the category display unit, a list of the descriptions of facilities under the selected category; and
a facility-information display unit displaying, when a facility is selected from the list of facilities displayed by the facility-list display unit, detailed information about the selected facility,
wherein the facility-information display unit displays the images representing the plurality of categories in a plurality of colors corresponding to the non-zero number of facilities found in the first and second search.

20. The facility search apparatus according to claim 1, wherein the shape of the images representing the categories is changed according to the non-zero number of facilities found within each category when the in-category facility search unit finds at least one facility located within the predetermined area including the search point.

* * * * *